US012072221B2

(12) United States Patent
Tong et al.

(10) Patent No.: US 12,072,221 B2
(45) Date of Patent: Aug. 27, 2024

(54) ULTRASONIC FLOW METER PATH LAYOUT CONFIGURATION

(71) Applicant: Honeywell International Inc., Morris Plains, NJ (US)

(72) Inventors: Jie Tong, Shanghai (CN); Wen Peng, Shanghai (CN); Bin Sai, Delft (NL)

(73) Assignee: Honeywell International Inc., Charlotte, NC (US)

( * ) Notice: Subject to any disclaimer, the term of this patent is extended or adjusted under 35 U.S.C. 154(b) by 326 days.

(21) Appl. No.: 17/035,513

(22) Filed: Sep. 28, 2020

(65) Prior Publication Data
US 2021/0096009 A1    Apr. 1, 2021

(51) Int. Cl.
G01F 1/667  (2022.01)
G01F 1/66   (2022.01)
G01F 15/14  (2006.01)
G01F 15/18  (2006.01)
G01K 13/02  (2021.01)

(52) U.S. Cl.
CPC .............. *G01F 1/667* (2013.01); *G01F 1/662* (2013.01); *G01F 15/14* (2013.01); *G01F 15/185* (2013.01); *G01K 13/02* (2013.01); *G01K 13/026* (2021.01)

(58) Field of Classification Search
CPC .......... G01F 1/667; G01F 1/662; G01F 15/14; G01F 15/185; G01K 13/02
USPC ...................................... 73/861.18
See application file for complete search history.

(56) References Cited

U.S. PATENT DOCUMENTS

| 4,024,760 | A  | * | 5/1977  | Estrada, Jr. | ............... G01F 1/66 |
| | | | | | 73/861.31 |
| 5,369,998 | A  | * | 12/1994 | Sowerby | ................. G01N 29/02 |
| | | | | | 73/861.04 |
| 8,291,773 | B2 | * | 10/2012 | Dietz | ...................... G01F 1/667 |
| | | | | | 73/861.31 |
| 8,544,343 | B2 | * | 10/2013 | Gottlieb | .................. G01F 1/665 |
| | | | | | 73/861.28 |
| 2016/0305911 | A1 | | 10/2016 | Ehrlrich | |
| 2018/0245960 | A1 | * | 8/2018 | Kishiro | .................... G01F 1/668 |
| 2018/0299305 | A1 | | 10/2018 | Starke et al. | |

FOREIGN PATENT DOCUMENTS

GB      1 533 845         11/1978
WO      2016016818 A1    2/2016
WO      WO-2016016818 A1 * 2/2016 ............... G01F 1/66

OTHER PUBLICATIONS

EP Search Report & Search Strategy, European Patent Application No. EP 20 19 9460; Feb. 8, 2021.

* cited by examiner

*Primary Examiner* — Nathaniel T Woodward
(74) *Attorney, Agent, or Firm* — Ortiz & Lopez, PLLC; Luis M. Ortiz; Kermit D. Lopez

(57) ABSTRACT

An ultrasonic flowmeter and a fluid pipeline. The ultrasonic flowmeter includes: a housing, which defines a fluid inlet and a fluid outlet with a fluid passage therebetween; and at least two pairs of ultrasonic sensors, wherein each pair of the at least two pairs of ultrasonic sensors have a first ultrasonic sensor and a second ultrasonic sensor arranged opposite to each other; wherein at least some of the at least two pairs of ultrasonic sensors are arranged in grooves on an inner wall of the fluid passage, and center points of front end faces of at least some of the at least two pairs of ultrasonic sensors are located on a cylindrical curved surface defined by the inner wall of the fluid passage.

15 Claims, 4 Drawing Sheets

ULTRASONIC FLOW METER PATH LAYOUT CONFIGURATION

CROSS REFERENCE TO RELATED PATENT APPLICATION

This patent application claims priority to and the benefit of Chinese Patent Application No. 201921648377.2 filed on Sep. 30, 2019, the disclosure of which is incorporated herein by reference in its entirety.

FIELD OF THE INVENTION

The present disclosure relates to the field of fluid metering, and more specifically, the present disclosure relates to an ultrasonic flowmeter and a fluid pipeline including the same.

BACKGROUND OF THE INVENTION

Ultrasonic flowmeters are currently widely used in various fields and are characterized by high measurement accuracy and wide measurement range. The ultrasonic flowmeter uses multiple pairs of ultrasonic sensors arranged in a pipeline, so that ultrasonic waves interact with a medium flowing in the pipeline, thereby measuring a flow velocity (i.e., flow rate) of the medium flowing in the pipeline. Generally, the number of ultrasonic sensors depends on requirements on pipeline size and accuracy, since ultrasonic measurement is largely affected by fluid profile (the distribution of flow velocity of the flow in the pipeline), measurement environment and installation conditions. Usually, multiple pairs of ultrasonic sensors are required to cover the entire measurement area, which increases the measurement cost and the complexity of rapid measurement control. It is very difficult for the ultrasonic sensors that are activated sequentially to obtain the same flowing state of the medium.

SUMMARY OF THE INVENTION

An object of the present disclosure is to solve or at least alleviate problems existing in the related art.

According to some aspects, an ultrasonic flowmeter is provided, which includes:
- a housing, which defines a fluid inlet and a fluid outlet with a fluid passage therebetween; and
- at least two pairs of ultrasonic sensors, wherein each pair of the at least two pairs of ultrasonic sensors have a first ultrasonic sensor and a second ultrasonic sensor arranged opposite to each other;
- wherein at least some of the at least two pairs of ultrasonic sensors are arranged in grooves on an inner wall of the fluid passage, and center points of front end faces of at least some of the at least two pairs of ultrasonic sensors are located on a cylindrical curved surface defined by the inner wall of the fluid passage.

Optionally, connecting lines of the first ultrasonic sensor and the second ultrasonic sensor in each pair of the at least two pairs of ultrasonic sensors are parallel to each other and form an included angle of 50-60° with a central axis of the fluid passage. Optionally, connecting lines of the first ultrasonic sensor and the second ultrasonic sensor in each pair of the at least two pairs of ultrasonic sensors form an included angle of 53-57° with the central axis of the fluid passage, or an included angle of 54-56°, or an included angle of approximately 55°.

Optionally, the center point of the front end face of each of the at least two pairs of ultrasonic sensors is located on the cylindrical curved surface defined by the inner wall of the fluid passage.

Optionally, ultrasonic sensors of the at least two pairs of ultrasonic sensors are each arranged in the same plane.

Optionally, the cross-section of the fluid passage is circular and has a radius R, wherein if 15 mm<R<75 mm, the ultrasonic flowmeter is configured with two pairs of ultrasonic sensors, and if 75 mm R<250 mm, the ultrasonic flowmeter is configured with three pairs of ultrasonic sensors.

Optionally, when there are two pairs of ultrasonic sensors configured, the two pairs of ultrasonic sensors are respectively located on both sides of the central axis, and distances from connecting lines of each pair of the two pairs of ultrasonic sensors to the central axis are in a range of 0.48R-0.52R, or in a range of 0.49R-0.51R, or are approximately 0.5R.

Optionally, when there are three pairs of ultrasonic sensors configured, a connecting line of one pair of the three pairs of ultrasonic sensors intersects the central axis, the other two pairs of the three pairs of ultrasonic sensors are located on both sides of the central axis respectively, and distances from connecting lines of each pair of the other two pairs of ultrasonic sensors to the central axis are in a range of 0.687R-0.727R, or in a range of 0.697R-0.717R, or are approximately 0.707R.

Optionally, when there is no rectifying device upstream and there is a straight pipeline, or a single horizontal bend, or a single vertical bend, or dual horizontal bends or dual vertical bends upstream within a length which is three times the pipeline diameter 3D, the ultrasonic flowmeter has an error of ±2% when the flow rate is less than 0.1 Qmax, and an error of ±1% when the flow rate is greater than or equal to 0.1 Qmax.

Optionally, the ultrasonic flowmeter further includes: connecting members at both ends of the fluid passage, a temperature sensor in the fluid passage, and a display outside the fluid passage.

In another aspect, a fluid pipeline is provided, which includes the ultrasonic flowmeter according to various embodiments.

BRIEF DESCRIPTION OF THE DRAWINGS

Hereinafter, embodiments according to the present disclosure will be explained in conjunction with the accompanying drawings. The disclosure of the present disclosure will become easier to understand with reference to the accompanying drawings.

DETAILED DESCRIPTION OF THE EMBODIMENT(S) OF THE INVENTION

Figure 1:
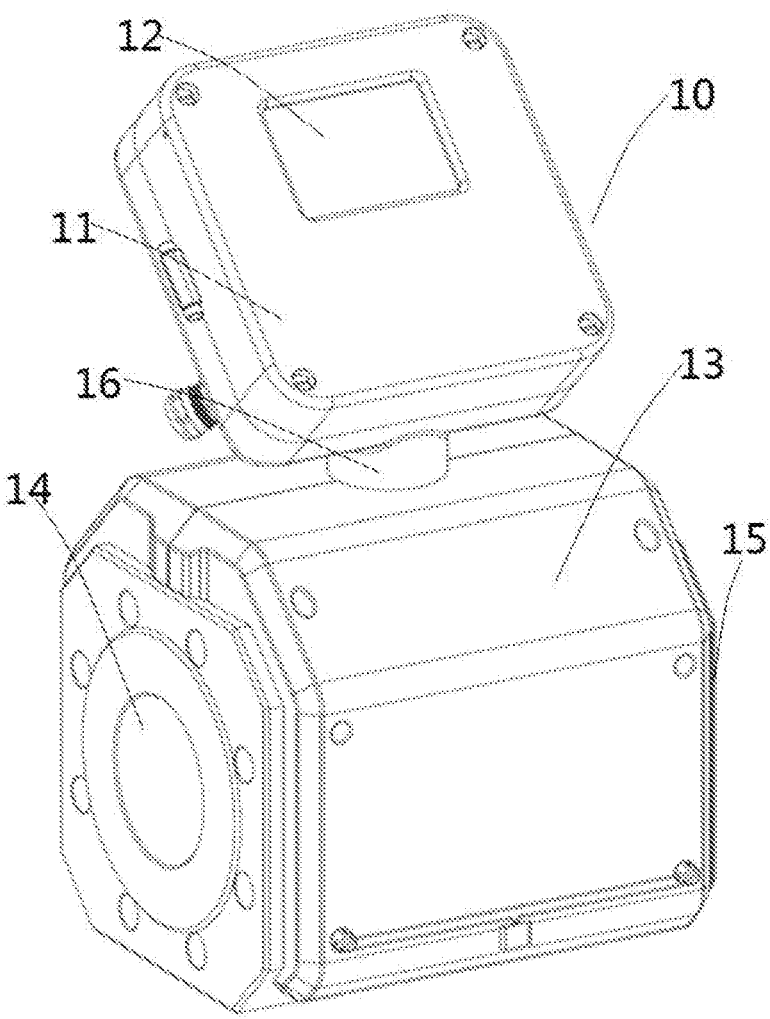
FIG. 1 shows a perspective view of a flowmeter according to an embodiment of the present disclosure.
Figure 2:
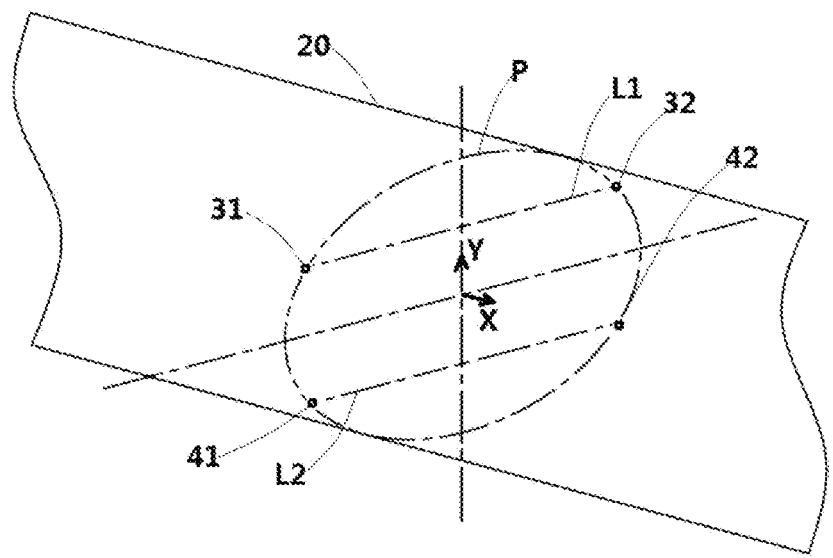
FIG. 2 is a schematic perspective view showing a fluid passage and the arrangement of ultrasonic sensors therein according to an embodiment of the present disclosure.
Figure 3:
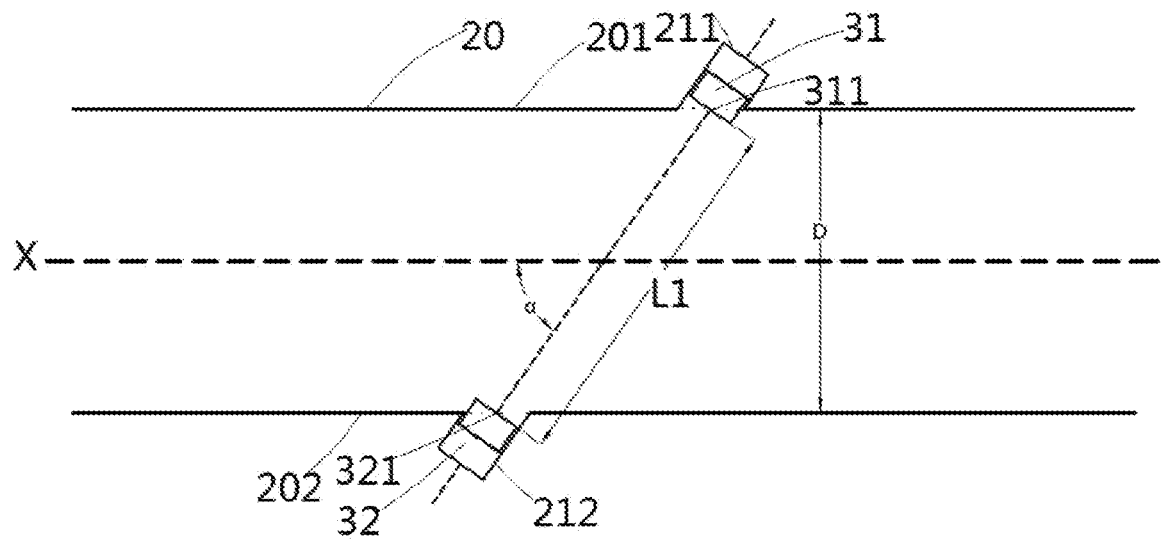
FIG. 3 is a schematic top view showing the fluid passage and the arrangement of ultrasonic sensors therein according to the embodiment of the present disclosure.
Figure 4:
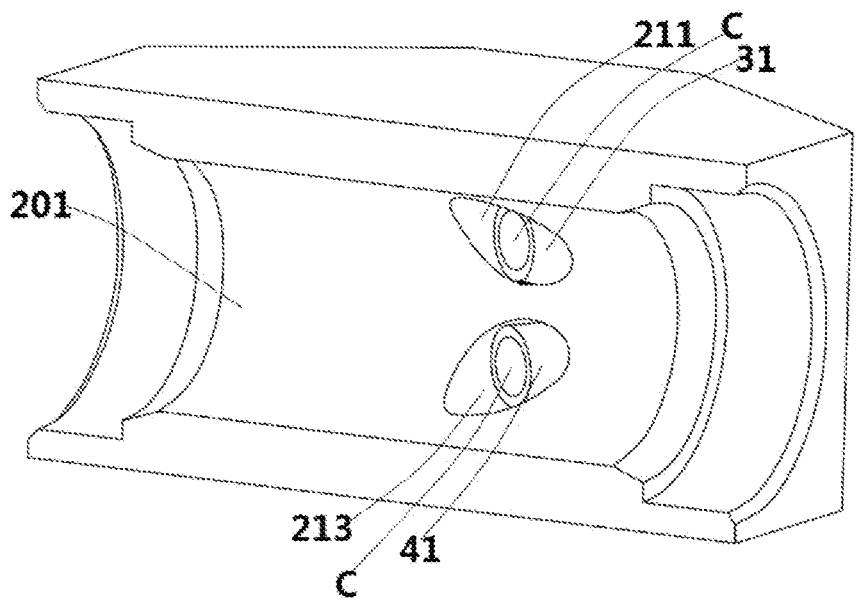
FIG. 4 shows a cross-sectional view of the fluid passage and the arrangement of ultrasonic sensors therein according to the embodiment of the present disclosure when viewed from a perspective.

It can be easily understood that according to the technical solutions of the present disclosure, without changing the essential spirit of the present disclosure, those skilled in the art can propose a variety of mutually replaceable structural modes and implementations. Therefore, the following specific embodiments and the accompanying drawings are merely exemplary illustrations of the technical solutions of the present disclosure, and should not be regarded as the entirety of the present disclosure or as definitions or limitations to the technical solutions of the present disclosure.

The orientational terms that have been mentioned or might be mentioned in this specification, such as "upper", "lower", "left", "right", "front", "rear", "front side", "back side", "top", "bottom", etc., are defined relative to the configurations shown in the drawings. They are relative concepts, so they may change accordingly according to their different locations and different states of use. Therefore, these or other orientational terms should not be interpreted as restrictive terms.

First, with reference to FIG. 1 to FIG. 5, an embodiment of an ultrasonic flowmeter is depicted. As shown in FIG. 1, the ultrasonic flowmeter 10 may include a housing 13, which defines a fluid inlet 14, a fluid outlet 15, and a fluid passage included between the fluid inlet 14 and the fluid outlet 15 (not shown in FIG. 1). The fluid inlet 14 and the fluid outlet 15 may include connecting members (such as flanges) for connecting with upstream and downstream pipelines. In some embodiments, the ultrasonic flowmeter 10 further includes a neck 16 and a meter head 11. The meter head 11 may include a calculation device and a display device 12. The calculation device may be configured to calculate the value of flow rate based on collected data and a predetermined function. The display device 12 may be configured to display flow rate readings and other status parameters, such as temperature, date, and time. In some embodiments, the meter head 11 or the housing 13 may include a solar panel to supply power to the ultrasonic flowmeter. As will be described in detail below, the fluid passage includes components such as ultrasonic sensors and an optional temperature sensor. Note that the terms "flow meter" and "flowmeter" as utilized herein can be utilized interchangeably to refer to the same.

With reference to FIG. 2 to FIG. 5, in this embodiment, the fluid passage 20 includes two pairs of ultrasonic sensors, i.e., a first pair of ultrasonic sensors and a second pair of ultrasonic sensors, wherein the first pair of ultrasonic sensors includes a first ultrasonic sensor 31 and a second ultrasonic sensor 32 arranged opposite to each other, and the second pair of ultrasonic sensors includes a first ultrasonic sensor 41 and a second ultrasonic sensor 42 arranged opposite to each other. The first ultrasonic sensor and the second ultrasonic sensor in each pair of ultrasonic sensors are arranged to interact with each other during measurement, that is, they can mutually transmit and capture ultrasonic signals. In some embodiments, connecting lines L1 and L2 of the first ultrasonic sensor and the second ultrasonic sensor in each pair of the two pairs of ultrasonic sensors are parallel to each other and form an included angle of 50-60° (see the top view of FIG. 3) with a central axis x of the fluid passage (or the axial direction of the fluid passage). In some embodiments, the included angle $\alpha$ may be in a range of 53-57°, or the included angle $\alpha$ may be in a range of 54°-56°, or the included angle $\alpha$ may be approximately 55°. During the test, the first ultrasonic sensor and the second ultrasonic sensor interact with each other to provide information related to the flow velocity, thereby assisting in calculating the flow velocity (i.e., flow rate) in the fluid passage 20. According to the embodiment of the present disclosure, by arranging the ultrasonic sensors at a specific angle, accurate measurement data is obtained with as few ultrasonic sensors as possible.

Figure 5:
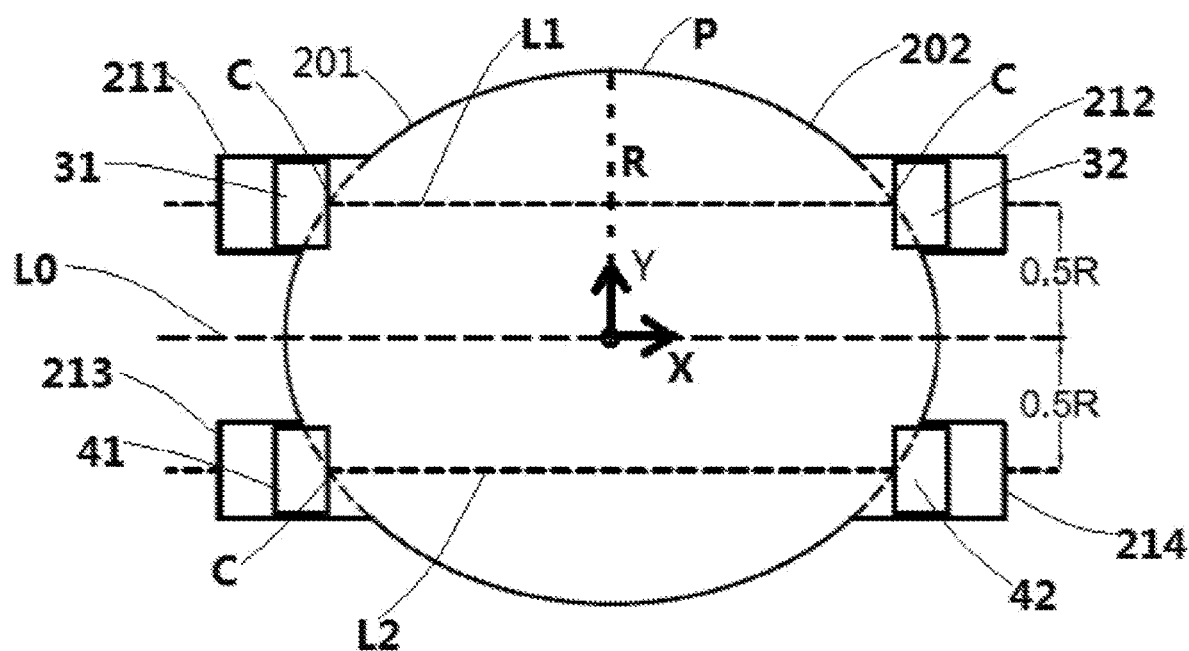
FIG. 5 shows a schematic cross-sectional view of the fluid passage and the arrangement of ultrasonic sensors therein according to the embodiment of the present disclosure when viewed from another perspective.

In some embodiments, the fluid passage 20 includes a first side wall 201 and a second side wall 202 separated by a vertical Y axis. The first ultrasonic sensors 31 and 41 of various pairs of ultrasonic sensors are arranged on the first side wall 201, and the second ultrasonic sensors 32 and 42 of various pairs of ultrasonic sensors are arranged on the second side wall 202. In some embodiments, an inner wall of the fluid passage 20 is provided with grooves 211, 212, 213 and 214 to arrange the respective ultrasonic sensors 31, 32, 41 and 42, and center points C of front end faces of at least some of the ultrasonic sensors 31, 32, 41 and 42 are located on a cylindrical curved surface defined by the inner wall of the fluid passage 20, and the missing portion of the cylindrical curved surface at the grooves is drawn as dotted lines in FIG. 3 and FIG. 5. In some embodiments, as shown in FIG. 5, the center points C of the front end faces of all the ultrasonic sensors in each pair of ultrasonic sensors are located on the cylindrical curved surface defined by the inner wall of the fluid passage. The ultrasonic sensors arranged in this way have fewer parts protruding into the fluid passage 20 so that the dynamic distribution state of circulating medium in the fluid passage is affected as little as possible. On the other hand, the ultrasonic sensors will not be affected due to being blocked in the grooves, thereby ensuring the accuracy of the measurement data.

In some embodiments, the ultrasonic sensors in each pair of ultrasonic sensors are all arranged in the same plane P, which intersects the cross section of the fluid passage 20 at the vertical axis Y, and the cross section of the fluid passage 20 refers to a cross section perpendicular to the central axis x of the fluid passage 20. A cross-sectional view along the plane P of the ultrasonic sensors is shown in FIG. 5. Generally speaking, the fluid passage 20 is circular in the cross section and has a radius R. In some embodiments, if the radius R of the fluid passage satisfies 15 mm<R<75 mm, the ultrasonic flowmeter 10 is configured with two pairs of ultrasonic sensors which are respectively located on both sides of the central axis x, and distances from connecting lines L1 and L2 of each pair of the two pairs of ultrasonic sensors to the central axis x may be in a range of 0.48R-0.52R, or for example in a range of 0.49R-0.51R, or for example may be approximately 0.5R.

Figure 6:
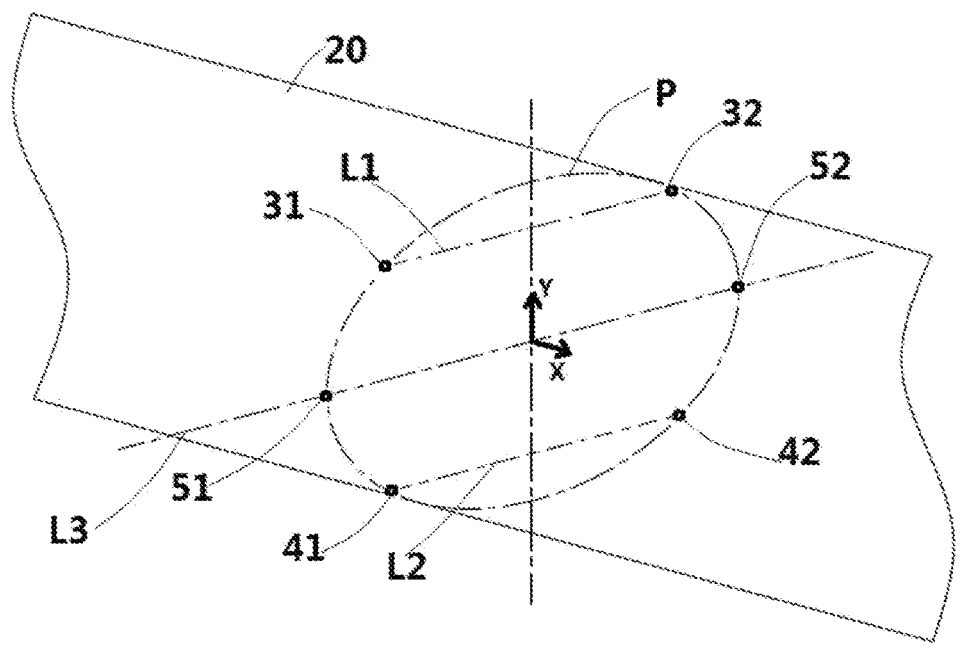
FIG. 6 is a schematic perspective view showing a fluid passage and the arrangement of ultrasonic sensors therein according to another embodiment of the present disclosure.
Figure 7:
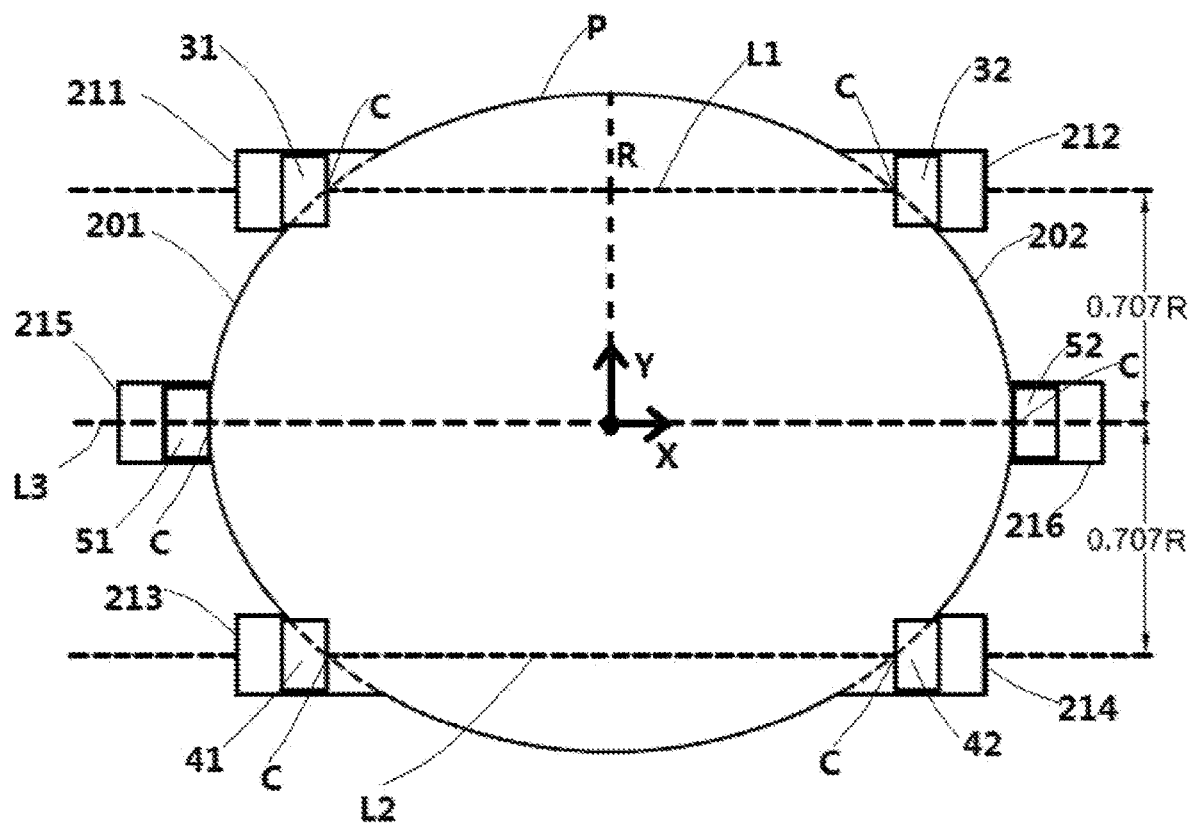
FIG. 7 shows a schematic cross-sectional view of the fluid passage and the arrangement of ultrasonic sensors therein according to another embodiment of the present disclosure when viewed from a perspective.
Figure 8:
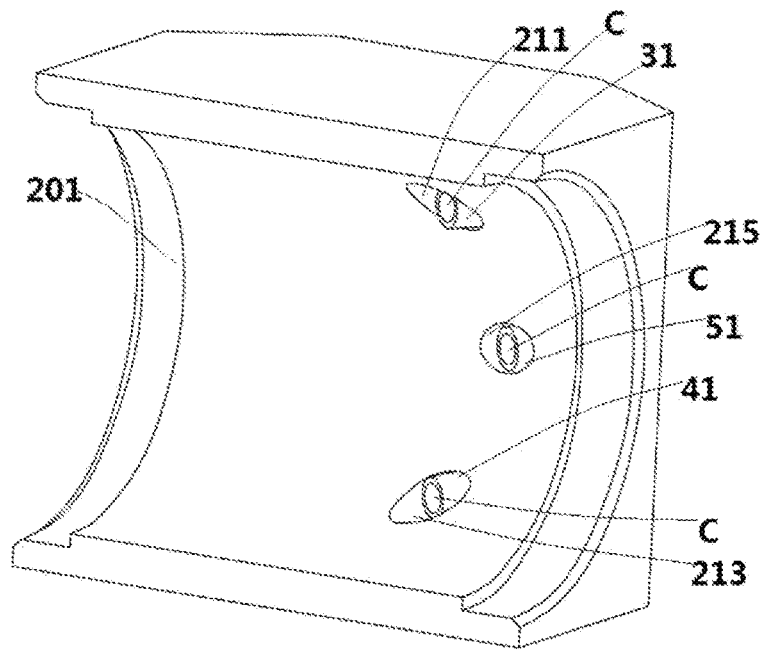
FIG. 8 shows a cross-sectional view of the fluid passage and the arrangement of ultrasonic sensors therein according to another embodiment of the present disclosure when viewed from another perspective.

Next, referring to FIG. 6 to FIG. 8, another embodiment of the ultrasonic flowmeter according to the present disclosure will be introduced. In this embodiment, the same parts as the previous embodiment will not be repeated. The difference is that the radius R of the fluid passage 20 satisfies 75 mm R<250 mm. In this situation, the ultrasonic flowmeter is configured with three pairs of ultrasonic sensors. In addition to the previously described ultrasonic sensors 31, 32, 41 and 42, a pair of ultrasonic sensors 51 and 52 can be added. As shown in FIG. 6 and FIG. 7, a connecting line L3 of the additional pair of ultrasonic sensors 51 and 52 may intersect the central axis x of the fluid passage, and the other two pairs of ultrasonic sensors are respectively located on both sides of the central axis x. In addition, distances from connecting lines L1 and L2 of the ultrasonic sensors of each of the two pairs to the central axis x are in a range of 0.687R-0.727R, or for example in a range of 0.697R-0.717R, or for example may be approximately 0.707R. In addition, as shown in FIG. 8, grooves 51, 52 for the third pair of ultrasonic sensors are respectively provided on the first side wall 201 and the second side wall 202 (not shown) of the fluid passage, and similarly, center points C of front end faces of each of the third pair of ultrasonic sensors are located on the cylindrical curved surface defined by the inner wall of the fluid passage. With the ultrasonic flowmeter arranged according to the embodiment of the present disclosure, three pairs of ultrasonic sensors can be used to perform accurate flow measurement in the case of a larger radius R.

The ultrasonic flowmeter according to the embodiment of the present disclosure can realize accurate measurement under various working conditions with a rectifying device arranged upstream, and the ultrasonic flowmeter according to the embodiment of the present disclosure can also realize that when there is no rectifying device (such as a rectifying ring) upstream and there is a straight pipeline, or a single horizontal bend, or a single vertical bend, or dual horizontal bends or dual vertical bends within a length which is three times the pipeline diameter 3D, the ultrasonic flowmeter has an error of ±2% when the flow rate is less than 0.1 Qmax, and an error of ±1% when the flow rate is greater than or equal to 0.1 Qmax, wherein Qmax is the maximum flow rate of the fluid passage. Therefore, the ultrasonic flowmeter according to the embodiment of the present disclosure has characteristics of being suitable for various working conditions, requiring no rectifying device, and high measurement accuracy. It should be understood that the rectifying device provided in the pipeline will bring additional flow resistance and other effects to the pipeline, whereas according to the embodiment of the present disclosure, not providing a rectifying device upstream is allowed.

It should be understood that the features of the various embodiments according to the present disclosure can be arbitrarily combined with each other without contradicting each other, and it is intended that such combinations be included in the scope of the present disclosure. The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. Therefore, it should be understood that these modifications or changes should be included within the scope of protection of the present disclosure.

What is claimed is:

1. An ultrasonic flowmeter, comprising:
a housing, which defines a fluid inlet and a fluid outlet with a fluid passage therebetween; and
at least three pairs of ultrasonic sensors, wherein each pair of the at least three pairs of ultrasonic sensors have a first ultrasonic sensor and a second ultrasonic sensor arranged opposite to each other;
wherein at least two pairs of the at least three pairs of ultrasonic sensors are arranged in grooves on an inner wall of the fluid passage, and center points of front end faces of the at least two of the at least three pairs of ultrasonic sensors are located on a cylindrical curved surface defined by the inner wall of the fluid passage,
wherein at least one pair of the at least three pairs of ultrasonic sensors are arranged in grooves on a first side wall and a second side wall of the fluid passage, and center points of front end faces of each of the at least one pair of ultrasonic sensors are located on the cylindrical curved surface defined by the inner wall of the fluid passage,
wherein the ultrasonic flowmeter is configured with the at least three pairs of ultrasonic sensors based on a cross-section of the fluid passage, wherein the cross section is circular and has a radius R with a range of 75 mm<R<250 mm of the cross-section of the fluid passage, and
wherein when there is a single horizontal bend, a single vertical bend, dual horizontal bends, or dual vertical bends upstream within a length that is three times a pipeline diameter 3D, the ultrasonic flowmeter comprises an error of ±2% when the flow rate is less than 0.1 Qmax, and an error of ±1% when the flow rate is greater than or equal to 0.1 Qmax, wherein Qmax is a maximum flow rate of the fluid passage.

2. The ultrasonic flowmeter of claim 1, wherein connecting lines of the first ultrasonic sensor and the second ultrasonic sensor in each pair of the at least two pairs of the at least three pairs of ultrasonic sensors are parallel to each other and form an included angle of 50-60° with a central axis of the fluid passage.

3. The ultrasonic flowmeter of claim 1, wherein connecting lines of the first ultrasonic sensor and the second ultrasonic sensor in each pair of the at least two pairs of the at least three pairs of ultrasonic sensors form an included angle of 53-57° with a central axis of the fluid passage, or an included angle of 54-56°, or an included angle of approximately 55°.

4. The ultrasonic flowmeter of claim 1, wherein the center point of the front end face of each of the at least two pairs of the at least three pairs of ultrasonic sensors is located on the cylindrical curved surface defined by the inner wall of the fluid passage.

5. The ultrasonic flowmeter of claim 1, wherein two pairs of ultrasonic sensors of the three pairs of ultrasonic sensors are respectively located on both sides of the central axis, and distances from connecting lines of each pair of the two pairs of ultrasonic sensors to the central axis are in a range of 0.48R-0.52R, or in a range of 0.49R-0.51R, or are approximately 0.5R.

6. The ultrasonic flowmeter of claim 1, wherein when there are three pairs of ultrasonic sensors configured, a connecting line of one pair of the three pairs of ultrasonic sensors intersects the central axis, the other two pairs of the three pairs of ultrasonic sensors are located on both sides of the central axis respectively, and distances from connecting lines of each pair of the other two pairs of ultrasonic sensors to the central axis are in a range of 0.687R-0.727R, or in a range of 0.697R-0.717R, or are approximately 0.707R.

7. The ultrasonic flowmeter of claim 1, further comprising connecting members at both ends of the fluid passage, a temperature sensor in the fluid passage, and a display outside the fluid passage.

8. The ultrasonic flowmeter of claim 1, further comprising a fluid pipeline comprising the fluid passage.

9. An ultrasonic flowmeter, comprising:
a housing, which defines a fluid inlet and a fluid outlet with a fluid passage therebetween; and
at least three pairs of ultrasonic sensors, wherein each pair of the at least three pairs of ultrasonic sensors have a first ultrasonic sensor and a second ultrasonic sensor arranged opposite to each other;
wherein at least two pairs of at least three pairs of ultrasonic sensors are arranged in grooves on an inner wall of the fluid passage, and center points of front end faces of the at least two of at least three pairs of ultrasonic sensors are located on a cylindrical curved surface defined by the inner wall of the fluid passage,
wherein at least one pair of at least three pairs of ultrasonic sensors are arranged in grooves on a first side wall and a second side wall of the fluid passage, and center points of front end faces of each of the at least one pair of ultrasonic sensors are located on the cylindrical curved surface defined by the inner wall of the fluid passage,
wherein connecting lines of the first ultrasonic sensor and the second ultrasonic sensor in each pair of the at least two pairs of ultrasonic sensors are parallel to each other and form an included angle of 50-60° with a central axis of the fluid passage,
wherein the ultrasonic flowmeter is configured with the at least three pairs of ultrasonic sensors based on a cross-section of the fluid passage, wherein the cross-section is circular and has a radius R with a range of 75 mm<R<250 mm of the cross-section of the fluid passage, and
wherein when there is a single horizontal bend, a single vertical bend, dual horizontal bends, or dual vertical bends upstream within a length that is three times a pipeline diameter 3D, the ultrasonic flowmeter comprises an error of ±2% when the flow rate is less than 0.1 Qmax, and an error of ±1% when the flow rate is greater than or equal to 0.1 Qmax, wherein Qmax is a maximum flow rate of the fluid passage.

10. The ultrasonic flowmeter of claim 9, wherein connecting lines of the first ultrasonic sensor and the second ultrasonic sensor in each pair of the at least two pairs of the at least three pairs of ultrasonic sensors form an included angle of 53-57° with a central axis of the fluid passage, or an included angle of 54-56°, or an included angle of approximately 55°.

11. The ultrasonic of claim 9, wherein the center point of the front end face of each of the at least two pairs of the at least three pairs of ultrasonic sensors is located on the cylindrical curved surface defined by the inner wall of the fluid passage.

12. The ultrasonic flowmeter of claim 9, wherein two pairs of ultrasonic sensors of the three pairs of ultrasonic sensors are respectively located on both sides of the central axis, and distances from connecting lines of each pair of the two pairs of ultrasonic sensors to the central axis are in a range of 0.48R-0.52R, or in a range of 0.49R-0.51R, or are approximately 0.5R.

13. The ultrasonic flowmeter of claim 9, wherein when there are three pairs of ultrasonic sensors configured, a connecting line of one pair of the three pairs of ultrasonic sensors intersects the central axis, the other two pairs of the three pairs of ultrasonic sensors are located on both sides of the central axis respectively, and distances from connecting lines of each pair of the other two pairs of ultrasonic sensors to the central axis are in a range of 0.687R-0.727R, or in a range of 0.697R-0.717R, or are approximately 0.707R.

14. The ultrasonic flowmeter of claim 9, further comprising connecting members at both ends of the fluid passage, a temperature sensor in the fluid passage, and a display outside the fluid passage.

15. The ultrasonic flowmeter of claim 9, further comprising a fluid pipeline comprising the fluid passage.

* * * * *